(12) United States Patent
Peterson et al.

(10) Patent No.: US 7,831,461 B2
(45) Date of Patent: Nov. 9, 2010

(54) REAL TIME VOTING REGARDING RADIO CONTENT

(75) Inventors: Michael J. Peterson, Farmington Hills, MI (US); Richard M. Lee, Bloomfield Village, MI (US); Faizan Syed, Ithaca, NY (US)

(73) Assignee: General Motors LLC, Detroit, MI (US)

( * ) Notice: Subject to any disclaimer, the term of this patent is extended or adjusted under 35 U.S.C. 154(b) by 384 days.

(21) Appl. No.: 11/931,998

(22) Filed: Oct. 31, 2007

(65) Prior Publication Data
US 2009/0112689 A1    Apr. 30, 2009

(51) Int. Cl.
*G06F 17/00* (2006.01)
(52) U.S. Cl. .......................... 705/10; 725/16
(58) Field of Classification Search .................. 705/10; 725/16
See application file for complete search history.

(56) References Cited

U.S. PATENT DOCUMENTS

| 4,107,735 A * | 8/1978 | Frohbach .................. 725/14 |
| 6,526,335 B1 * | 2/2003 | Treyz et al. .................. 701/1 |
| 2004/0205065 A1 * | 10/2004 | Petras et al. .................. 707/5 |
| 2007/0018952 A1 * | 1/2007 | Arseneau et al. ............ 345/156 |
| 2007/0155311 A1 | 7/2007 | Christensen et al. |
| 2008/0243586 A1 * | 10/2008 | Dohring et al. ............... 705/10 |
| 2009/0013356 A1 * | 1/2009 | Doerr et al. .................. 725/62 |

FOREIGN PATENT DOCUMENTS

GR        20040100458        9/2006

OTHER PUBLICATIONS

Lee, Jennifer; Interactive TV Arrives, Sort of; Apr. 4, 2002; The New York Times; 5 pages.*
Hayhurst; Leonard; Ask 411 Movies for Feb. 11, 2009; 411mania website; 7 pages.*

* cited by examiner

*Primary Examiner*—Thomas Dixon
(74) *Attorney, Agent, or Firm*—Dierker & Associates, P.C.

(57) ABSTRACT

A method for remotely participating in a listener survey includes receiving survey questions on an infotainment system, where the survey questions are at least partly displayed on a display portion of the infotainment system; transmitting to the survey provider a user input response to at least one of the survey questions; and receiving tabulated survey results of the survey, the results being at least partly displayed on the display portion of the infotainment system. A computer-readable medium storing a computer program and a system including a mechanism for practicing the above method are also disclosed.

18 Claims, 4 Drawing Sheets

LISTEN AND VOTE

REAL TIME PEOPLE'S CHOICE CHANNEL

- A CHANNEL THAT CONSTANTLY PLAYS MUSIC AS VOTED ON BY LISTENERS

REAL TIME VOTING FROM VEHICLE

- FROM VEHICLE, HOME, PERSONAL DEVICE
- SIMPLE USER INTERFACE TO VOTE FOR MUSIC
- DISPLAY REAL-TIME RESULTS ON RADIO

LISTEN AND VOTE

REAL TIME PEOPLE'S CHOICE CHANNEL
- A CHANNEL THAT CONSTANTLY PLAYS MUSIC AS VOTED ON BY LISTENERS

REAL TIME VOTING FROM VEHICLE
- FROM VEHICLE, HOME, PERSONAL DEVICE
- SIMPLE USER INTERFACE TO VOTE FOR MUSIC
- DISPLAY REAL-TIME RESULTS ON RADIO

REAL TIME VOTING REGARDING RADIO CONTENT

TECHNICAL FIELD

The present disclosure relates generally to real time voting regarding radio content.

BACKGROUND

Listener surveys relating to the content of radio broadcasts have been used in the past. Such surveys often allow the listener to write in or call in their favorite song while or soon after it is played on the radio. Operators of radio stations and record producers are eager to know the opinions of listeners about specific songs. Radio surveys give an early indication about whether or not a song will sell well or not. Similar surveys have also been used to poll listeners about news stories and sports events.

Such surveys are often conducted over a period of time, and as such, tabulating data from such surveys also takes time. Furthermore, the tabulated results of such surveys, if presented to the listeners, are often given in brief announcements or highlights of the total results. This may be due to the fact that orally conveying the complete results such that they can be comprehended by the casual radio listener may be difficult, especially when such results are broadcast hours or days after the survey was originally taken.

SUMMARY

A method for remotely participating in a listener survey includes receiving survey questions on an infotainment system, where the survey questions are at least partly displayed on a display portion of the infotainment system; transmitting to the survey provider a user input response to at least one of the survey questions; and receiving tabulated survey results of the survey, the results being at least partly displayed on the display portion of the infotainment system. A computer-readable medium storing a computer program for executing the method, and a system including means to practice the above method are also disclosed herein.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The method and system disclosed herein advantageously allow users to input responses to radio surveys via their in-vehicle infotainment system. Furthermore, the method and system enable survey providers to adjust program content based on results received by the users.

It is to be understood that, as used herein, the term "user" includes vehicle owners, operators, and/or passengers. It is to be further understood that the term "user" may be used interchangeably with listener, survey participant, and subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

It is to be further understood that "communication" is to be construed to include all forms of communication, including direct and indirect communication. As such, indirect communication may include communication between two components with additional component(s) located therebetween.

Figure 1:
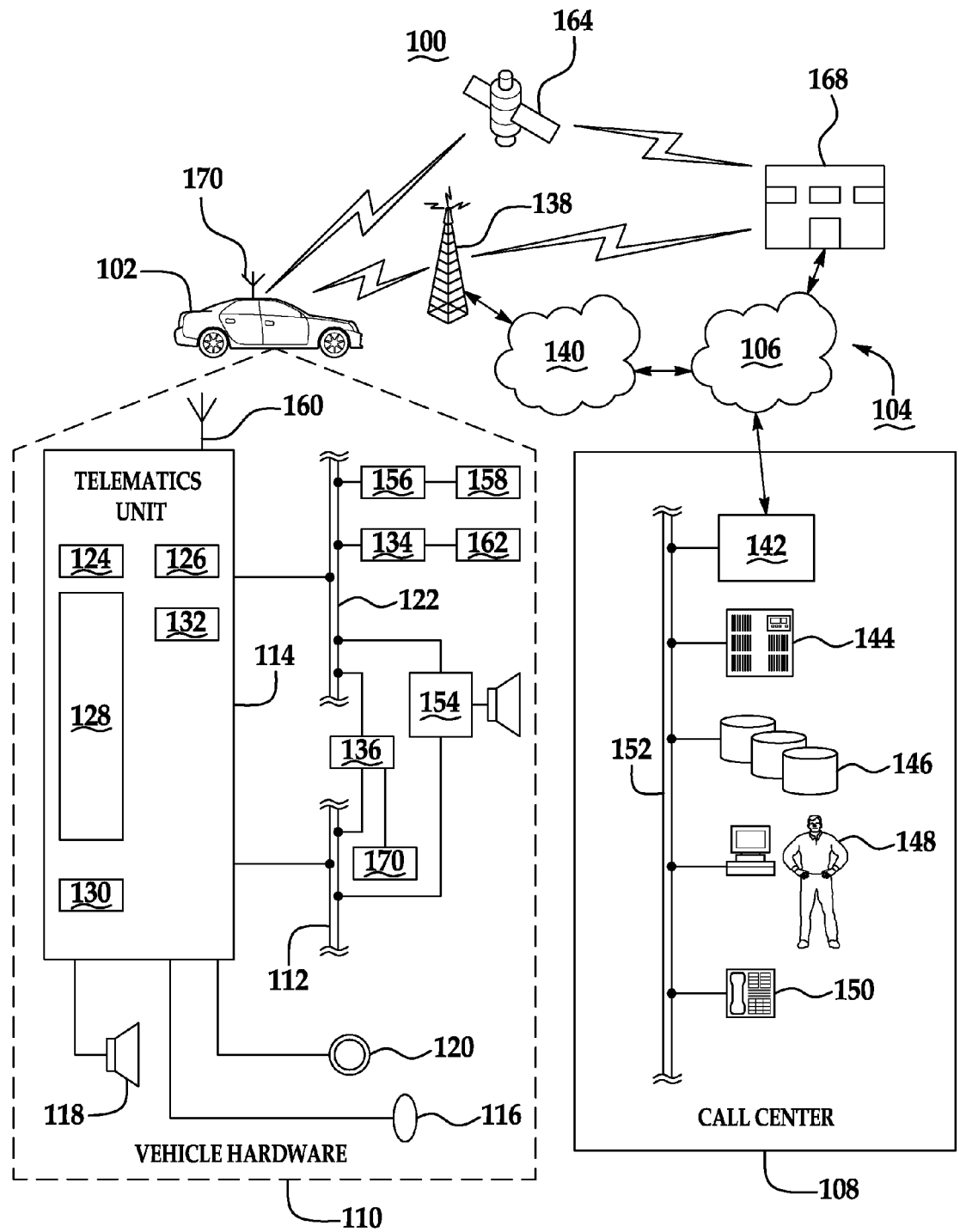
FIG. 1 is a schematic diagram depicting a system for receiving and responding to a survey broadcast.

Referring now to FIG. 1, a non-limiting example of a system 100 for implementing the method(s) disclosed herein is depicted. Specifically, a schematic diagram of the system 100 is depicted for receiving and responding to a survey broadcast via a wireless network or a satellite. In the example of FIG. 1, communication takes place between a vehicle 102 and a survey provider/broadcast program provider 168. While the survey provider/broadcast program provider 168 shown in FIG. 1 is shown outside of the call center 108 (discussed further hereinbelow), it is to be understood that the survey provider/broadcast program provider 168 may be located or embodied at the call center 108.

More specifically, FIG. 1 depicts an example of a communication system 100. This system includes a vehicle 102, a wireless carrier system 104, a land network 106 and the call center 108. The overall architecture, setup and operation, as well as the individual components of the system 100 shown in FIG. 1 are generally known in the art. Thus, the following paragraphs provide a brief overview of one such exemplary information system 100. It is to be understood, however, that additional components and/or other systems not shown here could employ the method(s) disclosed herein.

The vehicle 102 is a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1, including a telematics unit 114, a microphone 116, a speaker 118 and buttons and/or controls 120 connected to the telematics unit 114. Generally, these hardware 110 components enable a user to communicate with the telematics unit 114 and any other system 100 components in communication with the telematics unit 114.

Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications. The vehicle bus 122 enables the vehicle 102 to send and receive signals from the telematics unit 114 to various units of equipment and systems both outside the vehicle 102 and within the vehicle 102 to perform various functions, such as unlocking a door, executing personal comfort settings, and/or the like.

The telematics unit 114 is an onboard device that provides a variety of services both individually and through its communication with the call center 108. The telematics unit 114 generally includes an electronic processing device 128, one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. It is to be understood that telematics unit 114 may include additional components (e.g., a real-time clock, a short-range wireless communication network (e.g., a Bluetooth® unit), and/or the like, and/or combinations thereof) and functionality as desired for a particular end use.

The electronic processing device 128 may be a micro controller, a controller, a microprocessor, a host processor, and/or a vehicle communications processor. In another example, electronic processing device 128 may be an application specific integrated circuit (ASIC). Alternatively, electronic processing device 128 may be a processor working in conjunction with a central processing unit (CPU) performing the function of a general-purpose processor.

The navigation unit containing a GPS chipset/component 132 may include a Global Position System (GPS) receiver, a radio triangulation system, a dead reckoning position system, and/or combinations thereof. In particular, a GPS receiver provides accurate time and latitude and longitude coordinates of the vehicle 102 responsive to a GPS broadcast signal received from a GPS satellite constellation (not shown).

The cellular chipset/component 124 may be an analog, digital, dual-mode, dual-band, multi-mode and/or multi-band cellular phone.

Several examples of the many services provided by the telematics unit 114 include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle; and information/entertainment-related services where music, Web pages, movies, television programs, video games and/or other content is downloaded by an infotainment center/system 136 operatively connected to the telematics unit 114 via vehicle bus 122 and audio bus 112. In one example, downloaded content is stored for current or later playback.

The above-listed services are by no means an exhaustive list of all the capabilities of telematics unit 114, but are simply an illustration of some of the services that the telematics unit 114 is capable of offering.

Vehicle communications preferably use radio transmissions to establish a voice channel with a wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error may be used. A dual mode antenna 160 services the GPS chipset/component 132 and the cellular chipset/component 124.

A microphone 116 provides the operator of the vehicle 102 or other vehicle occupant with a means for inputting verbal or other auditory commands, and may be equipped with an embedded voice processing unit utilizing a human/machine interface (HMI) technology known in the art. Conversely, a speaker 118 provides verbal output to the vehicle occupants and may be either a stand-alone speaker specifically dedicated for use with the telematics unit 114 or may be part of a vehicle audio component 154. In either event, the microphone 116 and speaker 118 enable the vehicle hardware 110 and the call center 108 to communicate with the occupants of the vehicle 102 through audible speech. The vehicle hardware 110 also includes one or more buttons or controls 120 for enabling a vehicle occupant to activate or engage one or more of the vehicle hardware components 110. For example, one of the buttons 120 may be an electronic push button used to initiate voice communication with the call center 108 (whether it be a live advisor 148 or an automated call response system (not shown)). In another example, one of the buttons 120 may be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize a speaker 118 via arbitration on the vehicle bus 122 and/or audio bus 112.

In a non-limiting example, the vehicle hardware 110 also includes a display 170, which may be operatively connected to the telematics unit 114 directly, or may be part of the audio component 154 or infotainment center 136. Non-limiting examples of the display 170 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The vehicle crash and/or collision detection sensor interface 156 is/are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and/or the like. Example sensor interface modules 134 include power train control, climate control, and body control, to name but a few.

The wireless carrier system 104 is preferably a cellular telephone system or any other suitable wireless system that transmits signals between the vehicle hardware 110 and land network 106. According to an example, the wireless carrier system 104 includes one or more cell towers 138, base stations and/or mobile switching centers (MSCs) 140, as well as any other networking components required to connect the wireless system 104 with the land network 106. It is to be understood that various cell tower/base station/MSC arrangements are possible and could be used with wireless system 104. As non-limiting examples, a base station and a cell tower could be co-located at the same site or they could be remotely located, and a single base station could be coupled to various cell towers or various base stations could be coupled with a single MSC, to name but a few of the possible arrangements. A speech codec or vocoder may also be incorporated in one or more of the base stations, but depending on the particular architecture of the wireless network, it could be incorporated within a Mobile Switching Center or some other network components as well.

The land network 106 may be a conventional land-based telecommunications network that is connected to one or more landline telephones, and connects the wireless carrier network 104 to a call center 108. For example, the land network 106 may include a public switched telephone network (PSTN) and/or an Internet protocol (IP) network. It is to be understood that one or more segments of the land network 106 may be implemented in the form of a standard wired network, a fiber or other optical network, a cable network, other wireless networks such as wireless local networks (WLANs) or networks providing broadband wireless access (BWA), or any combination thereof.

The Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are coupled to one another via a network connection or bus 152, such as the one previously described in connection with the vehicle hardware 110.

The live advisor 148 may be physically present at the call center 108 or may be located remote from the call center 108 while communicating therethrough.

Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, the database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

The call center 108 may also interact with a service provider (not shown) to provide service(s) to the user. It is to be understood that, although the service provider may be located at the call center 108, the call center 108 is a separate and distinct entity from the service provider. In an example, the service provider is located remote from the call center 108. A service provider provides the user with telephone and/or Internet services. In an example, the service provider is a wireless carrier (such as, for example, Verizon Wireless®, AT&T®, Sprint®, etc.).

Disclosed herein is a method for broadcast program listeners to become direct, real time, survey participants by participating in a listener survey directly through the infotainment system 136 through which program is being played. Generally, the listeners may participate while simultaneously listening to the broadcast program. It is to be understood that the subject matter of the survey questions may be related to the broadcast program content (discussed further hereinbelow).

In an example of the method, the first step involves receiving survey questions via the infotainment system 136. The survey questions are displayed on the display screen 170 concurrently with the broadcast of the program by a broadcast program provider. In an example, the survey questions are transmitted to the vehicle bus 122 from the survey provider 168, which displays them (i.e., via display 170) to the listener.

The program and survey questions are broadcast and transmitted via any suitable wireless broadcast (via cell tower 138 or wireless carrier system 104) and/or satellite broadcast (via satellite 164). In an example, the broadcasting entity is also the survey provider 168. In another example, separate entities provide the program and the survey questions. In the latter example, however, it is to be understood that the separate entities may work together to simultaneously transmit the program and survey questions, and to render the content of the survey applicable to the content of the program.

The next step of the method involves transmitting a user input response to one or more of the survey questions to the survey provider 168. Generally, this is accomplished in response to a user input response being submitted by the listener/survey participant. The user input response is a listener's answer to a particular survey question. It is to be understood that the listener may answer one or more questions that are presented. In an example, the listener/survey participant responds to the survey questions by communicating responses directly to the broadcast program provider 168, either by means of the infotainment system 136, the audio component 154, and/or the telematics unit 114. In one example, the user may use the controls of the infotainment system 136 to input his/her response; in another example, the user may verbally communicate his/her response through the microphone 116; and in still another example, the user may use a phone (e.g., the in-vehicle phone, a cellular phone, etc.) to contact the survey provider 168.

After the listeners/survey participants have provided their responses to the survey questions, the response(s) are transmitted to the survey provider/broadcast program provider 168. In one example, the response(s) are transmitted from the infotainment system 136, microphone 116, or the phone via the wireless carrier system 104. User input responses communicated using in-vehicle hardware components 110 are transmitted to the survey provider/broadcast program provider 168 via the telematics unit 114, the infotainment system 136 and/or the audio component 154 using the audio and/or vehicle buses 112, 122 and the wireless carrier system 104.

The results of the survey responses received from all the listeners/survey participants are tabulated. The survey provider/broadcast program provider 168 may use the tabulated results to adjust the program content. For example, if the survey included questions pertaining to favorite songs, the survey provider/broadcast program provider 168 may then play the song at the top of the results list. The survey provider/broadcast program provider 168 may also send all or a portion of the tabulated results to the display screen of the infotainment system 136 of each listener/survey participant. In one example, this is accomplished via the telematics unit 114 and the vehicle bus 122.

In example(s) of the method, medium and system 100 described herein, the broadcast to the infotainment system 136 may be a wireless broadcast, a satellite broadcast, or a combination of the two.

Figure 2:
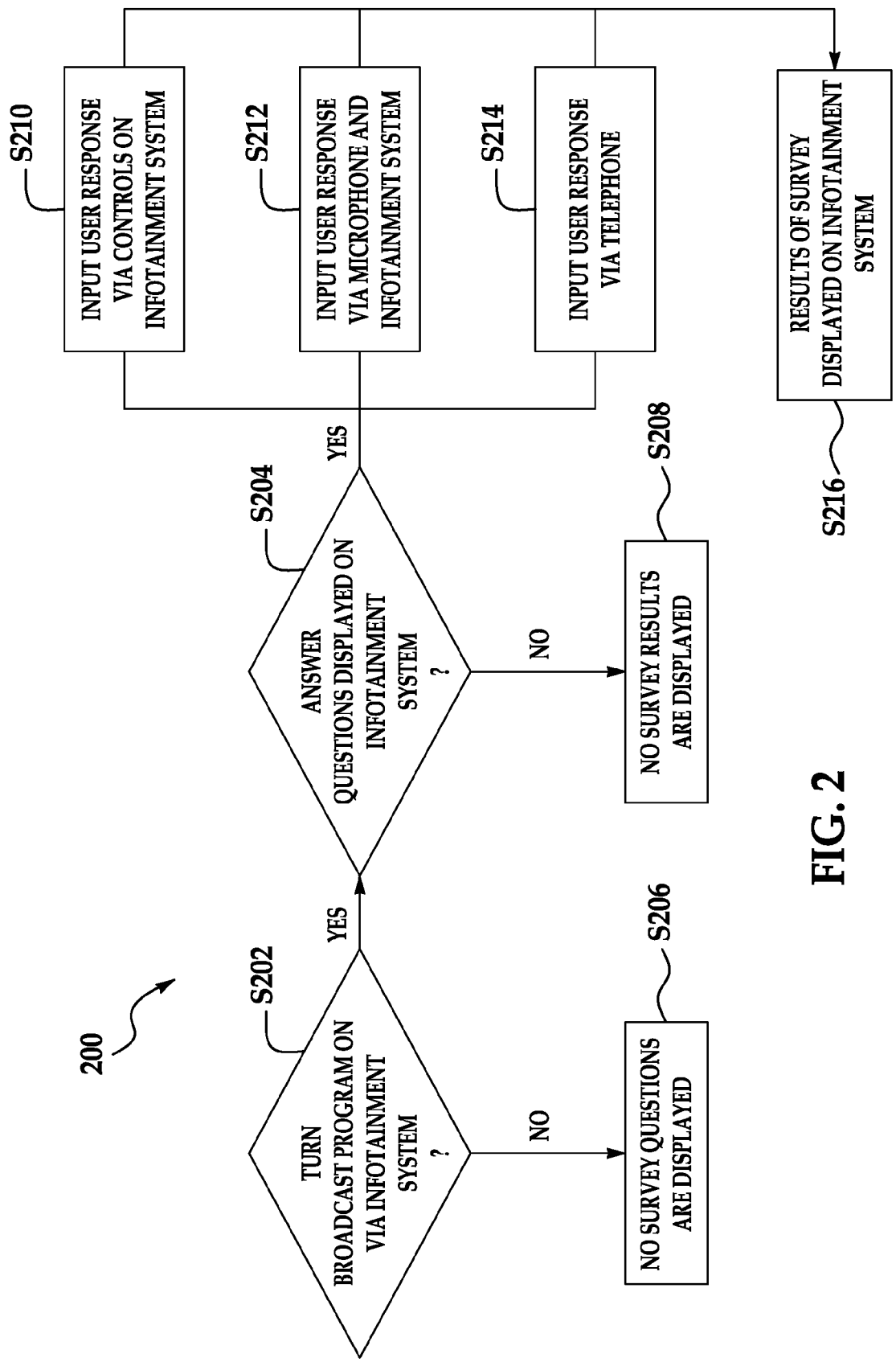
FIG. 2 is a flow diagram depicting alternative methods for a listener/survey participant to respond to a survey.

There are several ways for a listener/survey participant to participate in the survey using the method, medium and system 100 disclosed herein. Examples of some of these methods are illustrated in FIG. 2. During S202, a potential participant decides whether or not to turn on the infotainment system 136 and the broadcast related to the survey. If the user decides not to turn on the system 136, he/she does not receive the survey questions on his/her system 136, as shown at S206, and the method ends. If the potential participant turns on the infotainment system 136, as shown at S204, he/she must decide whether or not to participate in the survey. If he/she then decides not to participate in the survey after turning on the system 136, he/she does not receive the survey results on the infotainment system 136, as shown at S208, when the results are tabulated, and the method ends.

On the other hand, if the participant decides to participate in the survey, he/she can vote in one of three ways. He/she may decide to vote in the survey by activating designated controls, (such as buttons 120 shown in FIG. 1), on the infotainment system 136, as illustrated at S210. He/she may also decide to register his/her vote by orally delivering the vote using the microphone operatively connected to the infotainment system 136, as shown at S212. In still another example, he/she may vote by calling a designated number, for example, using a cellular phone, the in-vehicle phone, etc., as shown at S214.

If any of the three means provided in S210, S212 and S214 are chosen to register one or more votes, then the results of the survey from the votes of many participants who are listening and participating at their respective infotainment systems 136 are tabulated and sent to the display 170 of the respective infotainment systems 136 of the participants, as illustrated at S216.

In one example, the listener is a subscriber of the satellite service that is broadcasting the program and survey. If he/she calls in his/her vote (from a cellular phone not associated with the vehicle 102), he/she may provide the survey provider/broadcast program provider 168 with a pin number or other identifying piece of information that is used as an index into a database to identify the listener's vehicle 102 or in-vehicle satellite radio. This way, the survey provider/broadcast program provider 168 may transmit the tabulated results to the in-vehicle display 170.

In still another example, the user may be listening to the broadcast program via the infotainment system 136 of a computer or other electronic device (not shown). If the computer or other electronic device is configured with a TCP/IP address, the listener may vote via the computer/electronic device, and the survey provider/broadcast program provider 168 may use the TCP/IP address to transmit the tabulated results to the computer/electronic device.

In an example of the method, medium and system 100 described herein, there may be more than one survey participant responding to the survey. In numerous cases, there will likely be many survey participants for any particular survey. Other than the fact that more than one participant is likely to participate in the survey, there are no limits placed on the number of participants who may be included in the survey. In fact, the survey results may be tabulated even if one person responds to the survey.

In another typical example, the survey questions will be displayed on the display screen of the infotainment system 136 at the same time that a program is being broadcast on the infotainment system 136. As previously stated, the program being broadcast may have content directly related to the content of the survey questions. For example, if the survey relates to a certain news event, such as a U.S. presidential election, the program being broadcast at the same time would have content related to the presidential election. It is not required that the broadcast program be heard by the participant or even broadcast at the same time as the survey in order for the survey to be conducted or the participant to be able to participate in the survey, since, in some examples, the survey participant is given sufficient information to participate in the survey on the display 170 of the infotainment system 136 without needing further directions from the broadcast.

In still another example, the tabulated results of the survey may be used to adjust the content of the concurrent program being broadcast over the infotainment system 136. If, for example, the participants surveyed vote for a particular song as their favorite song or a particular type of music as their favorite type of music, the specific music content of the concurrent broadcast can be adjusted to reflect the choices indicated by the participants in the survey. It is to be understood that the content of the broadcast may be adjusted regardless of the subject.

The types of subject matter that can be used in the surveys vary widely. Indeed, any kind of subject matter that is likely to be of interest to a radio listener may be used. Such general subject matter types include the following broad, non-limiting categories: music, sports, news, human interest, weather, ethnic interest, religious interest, and/or the like, and/or combinations thereof (e.g., weather and human interest or news and religious interest).

The infotainment systems 136 described herein are systems that may be installed and used inside vehicles such as, without limitation, cars, trucks, motorcycles, recreational vehicles, boats and airplanes. These systems 136 can also be used as stationary or portable systems in other venues such as the following non-limiting examples: the home, hotels and motels, airports and other transportation waiting areas including mass transit stops, bars and restaurants, the workplace, commercial airlines, trains and buses, and in any other venue where people listen to radio broadcasts.

Figures 3, 4:
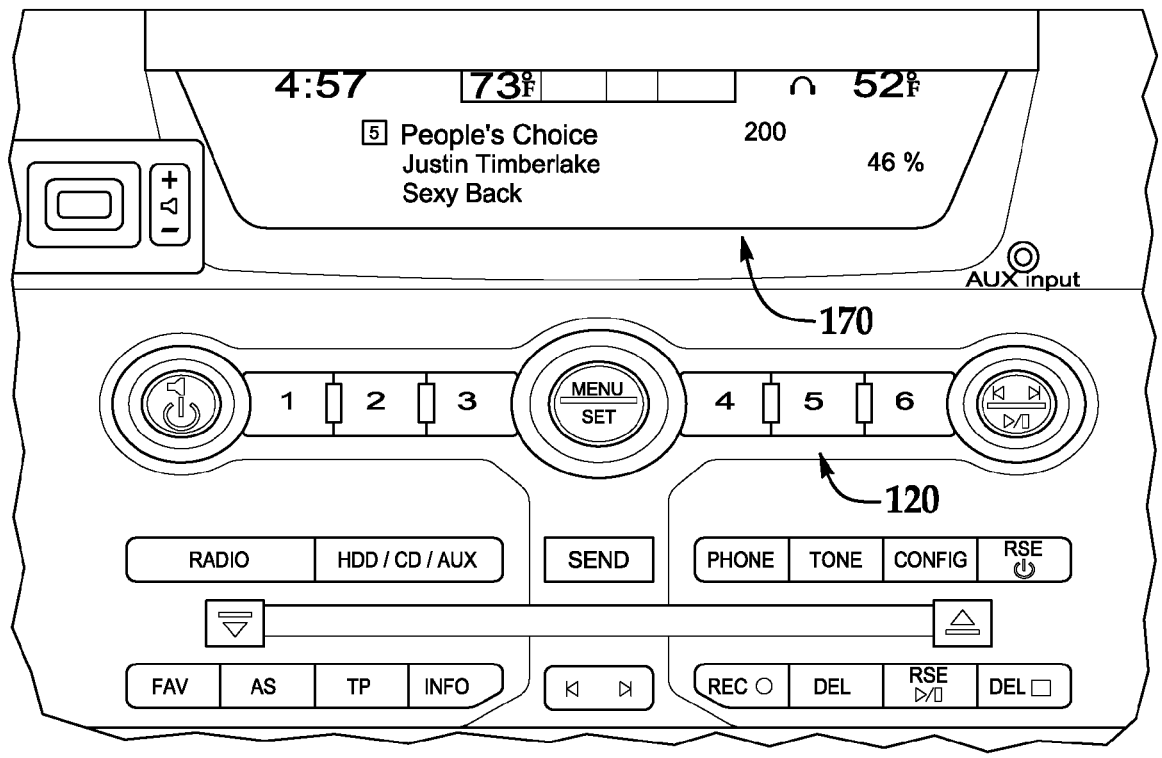
FIG. 3 lists examples of two different aspects of a method for receiving and responding to a survey broadcast.
FIG. 4 is a semi-schematic diagram depicting an infotainment system displaying the song receiving the most votes in a survey in which participants choose a favorite song by a specific performer.

FIG. 3 enumerates two aspects of an example of the present disclosure, the example being described by the phrase "Listen and Vote". The first aspect of the example, "Real Time People's Choice Channel", is a radio channel which continually allows listeners to vote on songs played. The results are tabulated and the radio station constantly plays listeners' choices of songs on its broadcast. The second aspect, "Real Time Voting from Vehicle", lists the benefits of voting for favorite music wherever the listener happens to be listening to the radio. Because the radio associated with the infotainment center 136 disclosed herein has a simple-to-use display interface, the listener is able to easily vote and the infotainment system 136 can display real time results on the radio display screen.

Figure 5:
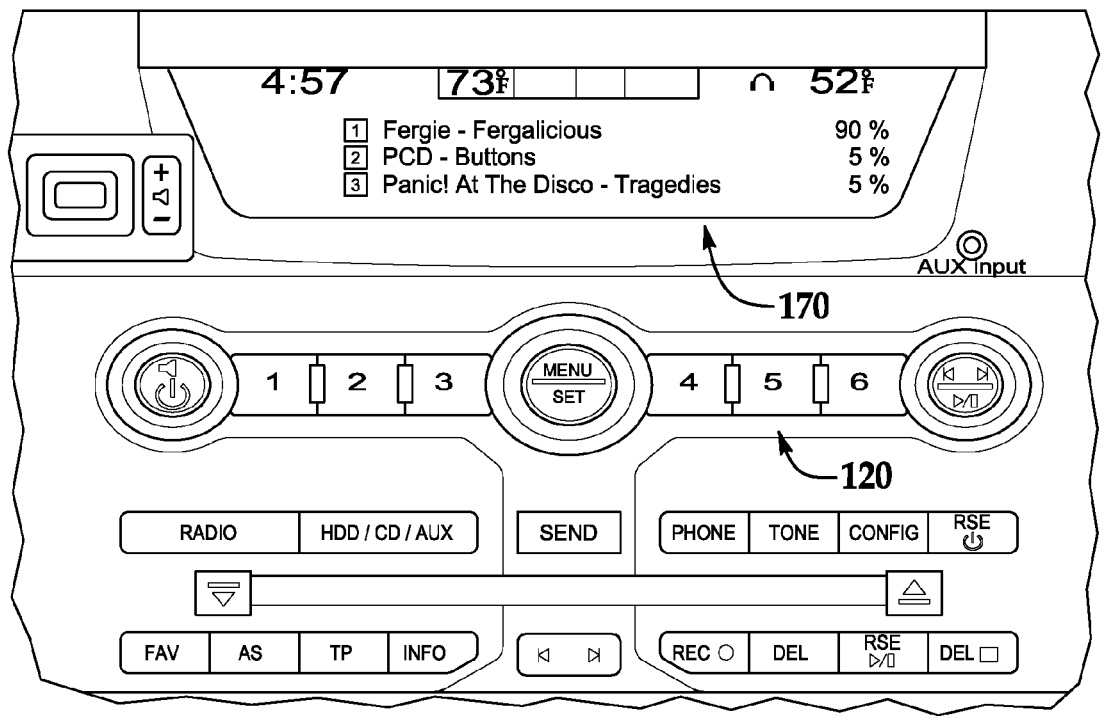
FIG. 5 is a semi-schematic diagram depicting an infotainment system displaying the respective results of a survey in which participants voted for their favorite among several songs.

FIGS. 4 and 5 each illustrate a car radio display 170, the display 170 showing the results of listeners voting among specific songs by specific performers. FIG. 4 shows the percentage results indicating the popularity amongst the voters of one song of a specific performer in the survey. FIG. 5 shows the comparative percentage results indicating the popularity amongst the voters of three specific songs by specific performers.

Figure 6:
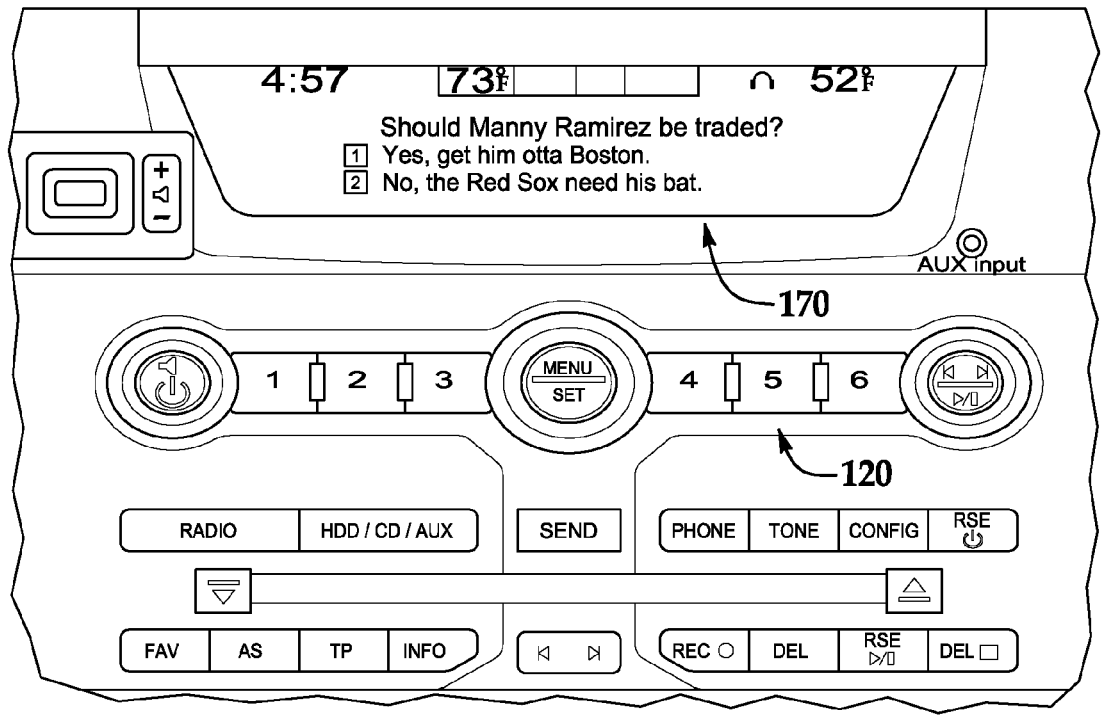
FIG. 6 is a semi-schematic diagram depicting an infotainment system displaying a current sports issue being voted on and voting choices in response thereto.

FIG. 6 also illustrates a car radio display 170 showing an example of a yes-or-no format survey question related to the listeners' opinion of a specific professional baseball player. As shown, the display 170 provides numbered positive and negative voting choices by which the listener/participant may vote to express his opinion of the player. In one example, the user may vote by selecting "1" or "2" on the controls 120.

While several embodiments have been described in detail, it will be apparent to those skilled in the art that the disclosed embodiments may be modified. Therefore, the foregoing description is to be considered exemplary rather than limiting.

The invention claimed is:

1. A method for remotely participating in a listener survey, the method comprising:

via a wireless network or a satellite, receiving survey questions on an infotainment system from a survey provider, the survey questions being at least partly displayed on a display portion of the infotainment system, wherein a subject matter of the survey questions relates to content of a program being concurrently broadcast to the infotainment system;

via one of the infotainment system, an audio component, or a telematics unit, transmitting to the survey provider a user input response to at least one of the survey questions, the transmitting being accomplished during the broadcast of the program;

via the wireless network or the satellite and during the broadcast of the program, receiving tabulated results of the survey, the results being at least partly displayed on the display portion of the infotainment system; and via computer equipment operatively associated with the survey provider, adjusting the content of the program based on the tabulated results of the survey, the adjusting being accomplished during the broadcast of the program.

2. The method according to claim 1 wherein the listener survey is broadcast to the infotainment system via a wireless broadcast or a satellite broadcast.

3. The method according to claim 1, further comprising inputting the user input response by activating designated controls at an indicated place on the display portion of the infotainment system, by verbally communicating answers through a microphone operatively connected to the infotainment system, or by telephoning a designated telephone number.

4. The method according to claim 1 wherein the tabulated results of the survey include the user input response and at least one other user input response transmitted from an other infotainment system.

5. The method according to claim 1 wherein a subject matter of the survey is related to a topic selected from music, sports, news, human interest, weather, ethnic interest, religious interest and combinations thereof.

6. The method according to claim 1 wherein the infotainment system is installed in a vehicle selected from a car, a truck, a motorcycle, a recreational vehicle, a boat, and an airplane.

7. A computer readable medium storing a computer program, comprising:

computer readable code for receiving survey questions on an infotainment system from a survey provider, the survey questions being at least partly displayed on a display portion of the information/entertainment system, wherein a subject matter of the survey questions relate to content of a program being then-currently broadcast to the infotainment/entertainment system;

computer readable code for transmitting to the survey provider user input responses to the survey questions during the broadcast of the program;

computer readable code for receiving tabulated results of the survey during the broadcast of the program, the results being displayed at least partly on the display portion of the infotainment system; and computer readable code for adjusting, during the broadcast, the content of the program based on the tabulated results of the survey.

8. The computer-readable medium according to claim 7, wherein the listener survey is broadcast to the infotainment system by a wireless broadcast, a satellite broadcast or a combination thereof.

9. The computer-readable medium according to claim 7 wherein the user input responses to the survey questions are communicated by activating designated controls at an indicated place on the display portion of the infotainment system, by verbally communicating answers through a microphone connected to the infotainment system, or by telephoning a designated telephone number.

10. The computer-readable medium according to claim 7 wherein the tabulated results of the survey include the user input responses and at least one other user input response transmitted from an other infotainment system.

11. The computer-readable medium according to claim 7 wherein a subject matter of the survey is related to a topic selected from music, sports, news, human interest, weather, ethnic interest, religious interest and combinations thereof.

12. The computer-readable medium according to claim 7 wherein the infotainment system is installed in a vehicle selected from a car, a truck, a motorcycle, a recreational vehicle, a boat, and an airplane.

13. A system for remotely participating in a listener survey, the system comprising:

means for receiving survey questions on an infotainment system, the survey questions being at least partly displayed on a display portion of the infotainment system; wherein a subject matter of the survey questions relate to content of a program being then-currently broadcast to the infotainment system;

means for transmitting to the survey provider a user input response to at least one of the survey questions during the broadcast of the program;

means for receiving tabulated results of the survey during the broadcast of the program, the results being at least partly displayed on the display portion of the infotainment system; and means for adjusting the content of the program based on the tabulated results of the survey during the broadcast of the program.

14. The system according to claim 13 wherein the listener survey is broadcast to the infotainment system by a wireless broadcast, a satellite broadcast, or combinations thereof.

15. The system according to claim 13 wherein the user input response is communicated by activating designated controls at an indicated place on the display portion of the infotainment system, by verbally communicating answers through a microphone operatively connected to the infotainment system, or by telephoning a designated telephone number.

16. The system according to claim 13 wherein the tabulated results of the survey include the user input response and at least one other user input response transmitted by an other infotainment system.

17. The system according to claim 13 wherein a subject matter of the survey is related to a topic selected from music, sports, news, human interest, weather, ethnic interest, religious interest and combinations thereof.

18. The system according to claim 13 wherein the infotainment system is installed in a vehicle selected from a car, a truck, a motorcycle, a recreational vehicle, a boat, and an airplane.

* * * * *